US012688643B2

(12) United States Patent　　　　(10) Patent No.:　US 12,688,643 B2
Hu et al.　　　　　　　　　　　　　(45) Date of Patent:　　Jul. 21, 2026

(54) VARIABLE RATE BVH TRAVERSAL

(71) Applicant: Advanced Micro Devices, Inc., Santa Clara, CA (US)

(72) Inventors: Zhen Hu, Shanghai (CN); Yue Zhuo, Shanghai (CN); LingPeng Jin, Shanghai (CN); Mingtao Gu, Shanghai (CN); ZhongXiang Luo, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 130 days.

(21) Appl. No.: 18/171,040

(22) Filed: Feb. 17, 2023

(65) Prior Publication Data

US 2024/0282044 A1　　Aug. 22, 2024

(51) Int. Cl.
G06T 15/06　　　　(2011.01)
G06T 15/00　　　　(2011.01)

(52) U.S. Cl.
CPC ............ G06T 15/06 (2013.01); G06T 15/005 (2013.01); *G06T 2210/21* (2013.01); *G06T 2210/52* (2013.01)

(58) Field of Classification Search
CPC .. G06T 15/06; G06T 2210/21; G06T 2210/52
See application file for complete search history.

(56) References Cited

U.S. PATENT DOCUMENTS

| | | | | |
|---|---|---|---|---|
| 2014/0168228 A1* | 6/2014 | Luebke | ................. | G06F 9/5066 |
| | | | | 345/505 |
| 2015/0348308 A1* | 12/2015 | Lee | ......................... | G06T 15/06 |
| | | | | 345/426 |
| 2018/0182158 A1* | 6/2018 | Karras | .................... | G06T 15/06 |
| 2020/0050550 A1* | 2/2020 | Muthler | .............. | G06F 16/9027 |
| 2020/0051312 A1* | 2/2020 | Muthler | ................. | G06T 15/06 |
| 2021/0209832 A1* | 7/2021 | Saleh | .................... | G06T 15/005 |
| 2022/0036630 A1* | 2/2022 | Rabbani Rankouhi | ...................... | |
| | | | | G06F 9/4881 |
| 2022/0036639 A1* | 2/2022 | Rabbani Rankouhi | ...................... | |
| | | | | G06T 15/06 |
| 2023/0237729 A1* | 7/2023 | Muthler | ................. | G06T 15/06 |
| | | | | 345/426 |

OTHER PUBLICATIONS

Chitalu, F. M., et. al., "Bulk-Synchronous Parallel Simultaneous BVH Traversal for Collision Detection on GPUs", I3D '18 Proceedings of the ACM SIGGRAPH Symposium on Interactive 3D Graphics and Games, May 15, 2018, 10 pgs.

* cited by examiner

*Primary Examiner* — Yu Chen
(74) *Attorney, Agent, or Firm* — Volpe Koenig

(57)　　　　　ABSTRACT

A technique for performing ray tracing operations is provided. The technique includes, submitting a plurality of intersection test requests to an intersection test unit, wherein the plurality of intersection test requests are submitted prior to receiving results of any of the intersection test requests from the intersection test unit.

20 Claims, 12 Drawing Sheets

402

404

VARIABLE RATE BVH TRAVERSAL

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes submitting a plurality of intersection test requests to an intersection test unit, wherein the plurality of intersection test requests are submitted prior to receiving results of any of the intersection test requests from the intersection test unit.

Figure 1:
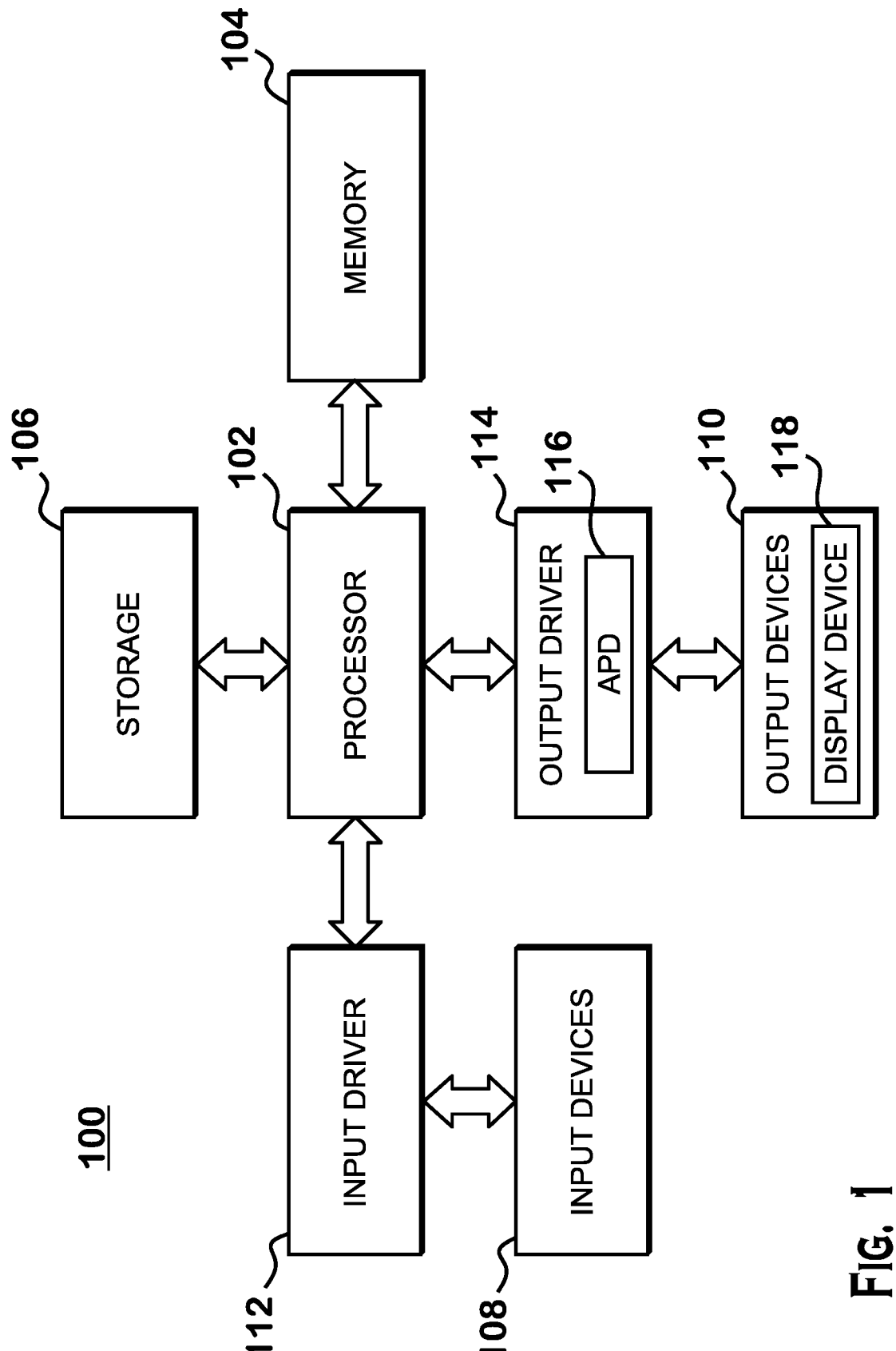
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
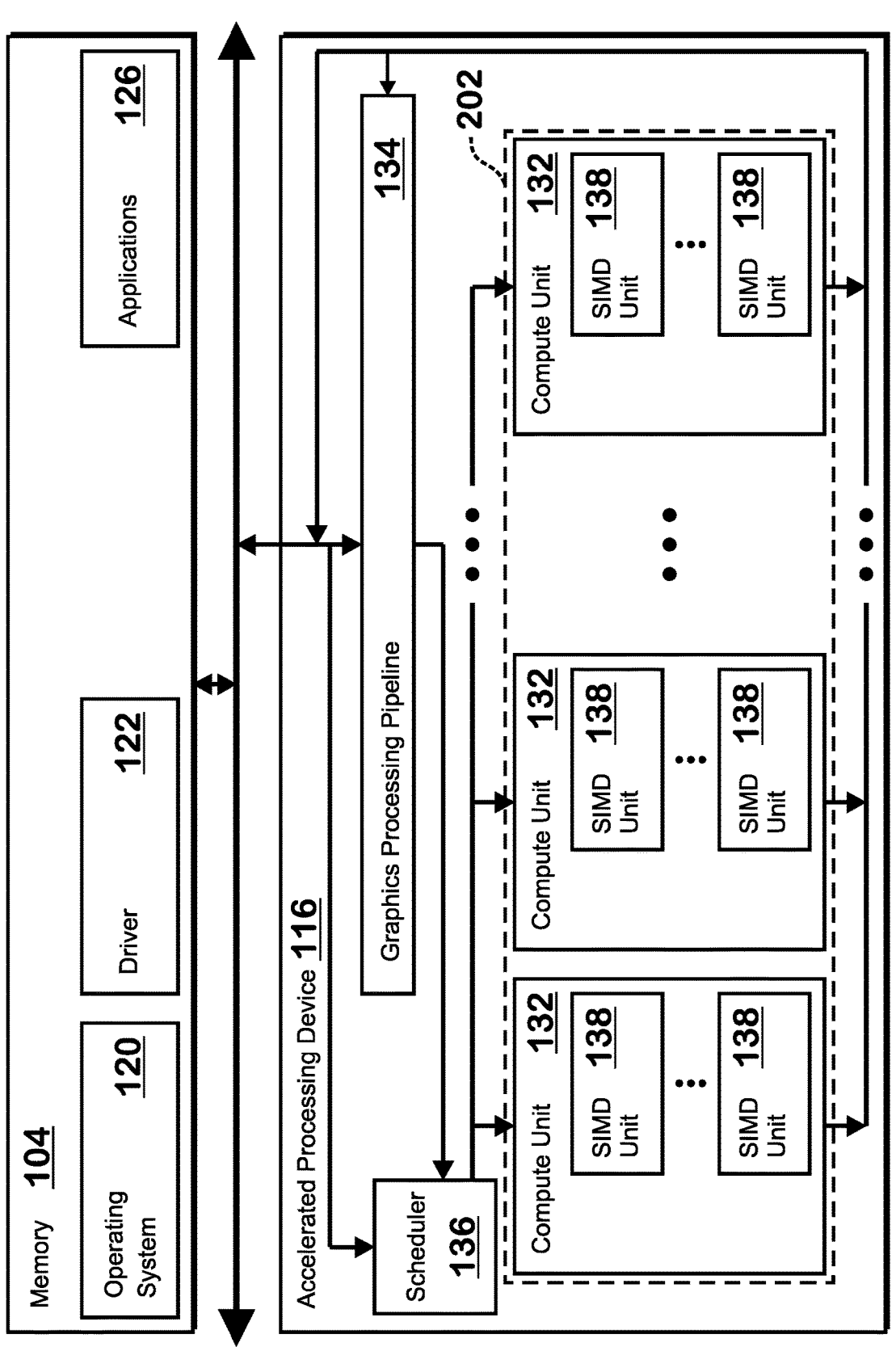
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen or thirty two lanes, where each lane executes the same instruction at the same time as the other lanes in the SIMD unit 138 but executes that instruction with different data. Lanes can be switched off with predication if not all lanes are to execute a given instruction. Predication can be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as a collection of work-items that can be executed simultaneously on a single SIMD unit 138, although it is possible for wavefronts to be divided into sets of work-items, each of which is executed simultaneously on a single SIMD unit 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
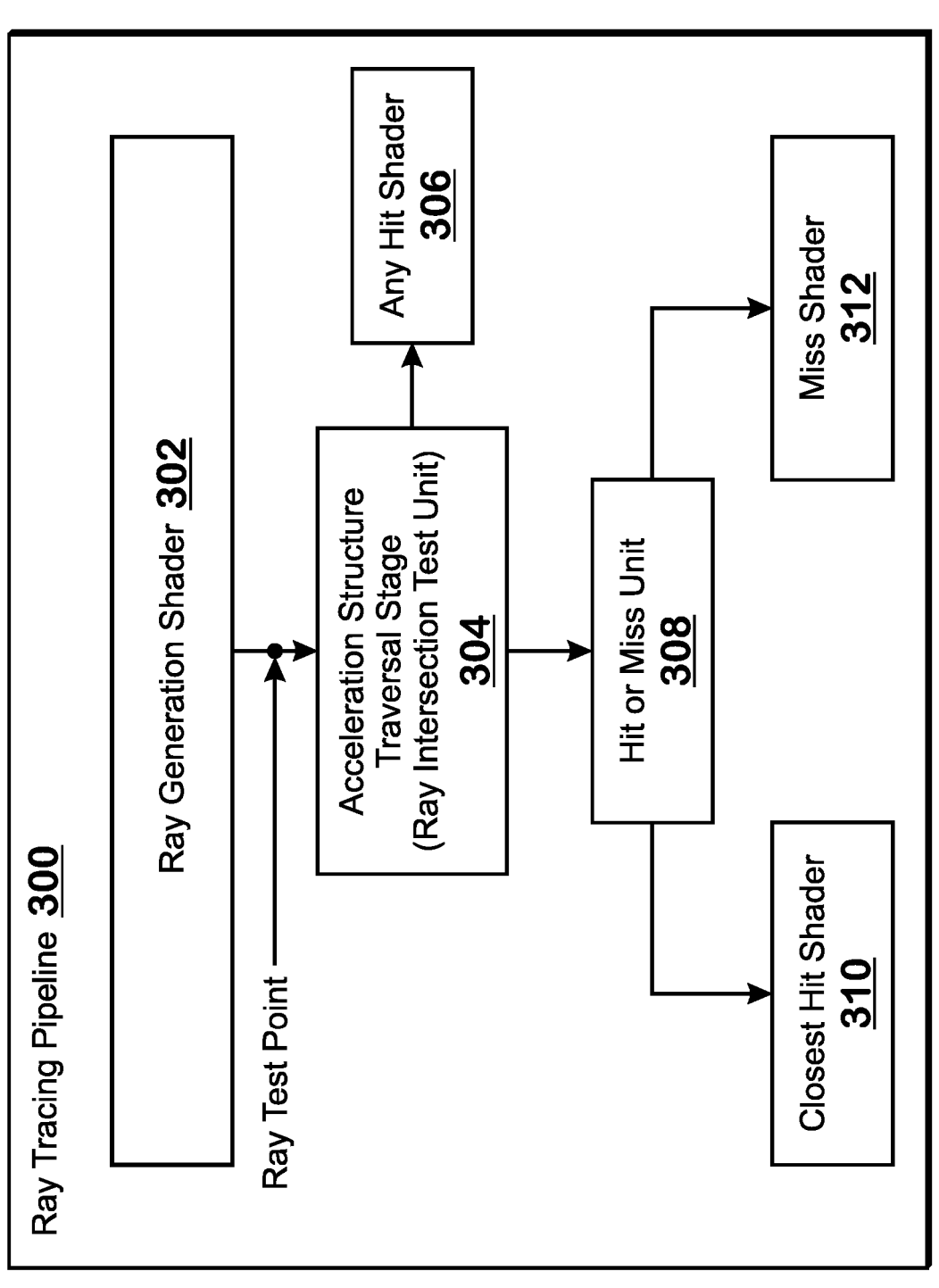
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle or a box.

The ray tracing pipeline 300 indicates the path through which a ray tracing operation flows. To render a scene using ray tracing, a rendering orchestrator, such as a program executing on the processor 102, designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image and requesting rays be traced from the camera through the image. The ray tracing pipeline 300 performs the various operations described herein to determine colors for the rays. The ray tracing pipeline 300 designates colors for the pixels of the image, based on the results of ray tracing operations for rays traced through the image. For example, a ray that hits a green triangle and passes through a particular screen position in the image is able to color the pixel corresponding to that screen position green.

Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [an action]" is used, this means that the hardware and/or software that implements the ray tracing pipeline 300 does that action. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is executed. The ray generation shader 302 sets up data for a ray to test against triangles of a scene and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

It is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen (the "image" above) defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In an example bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
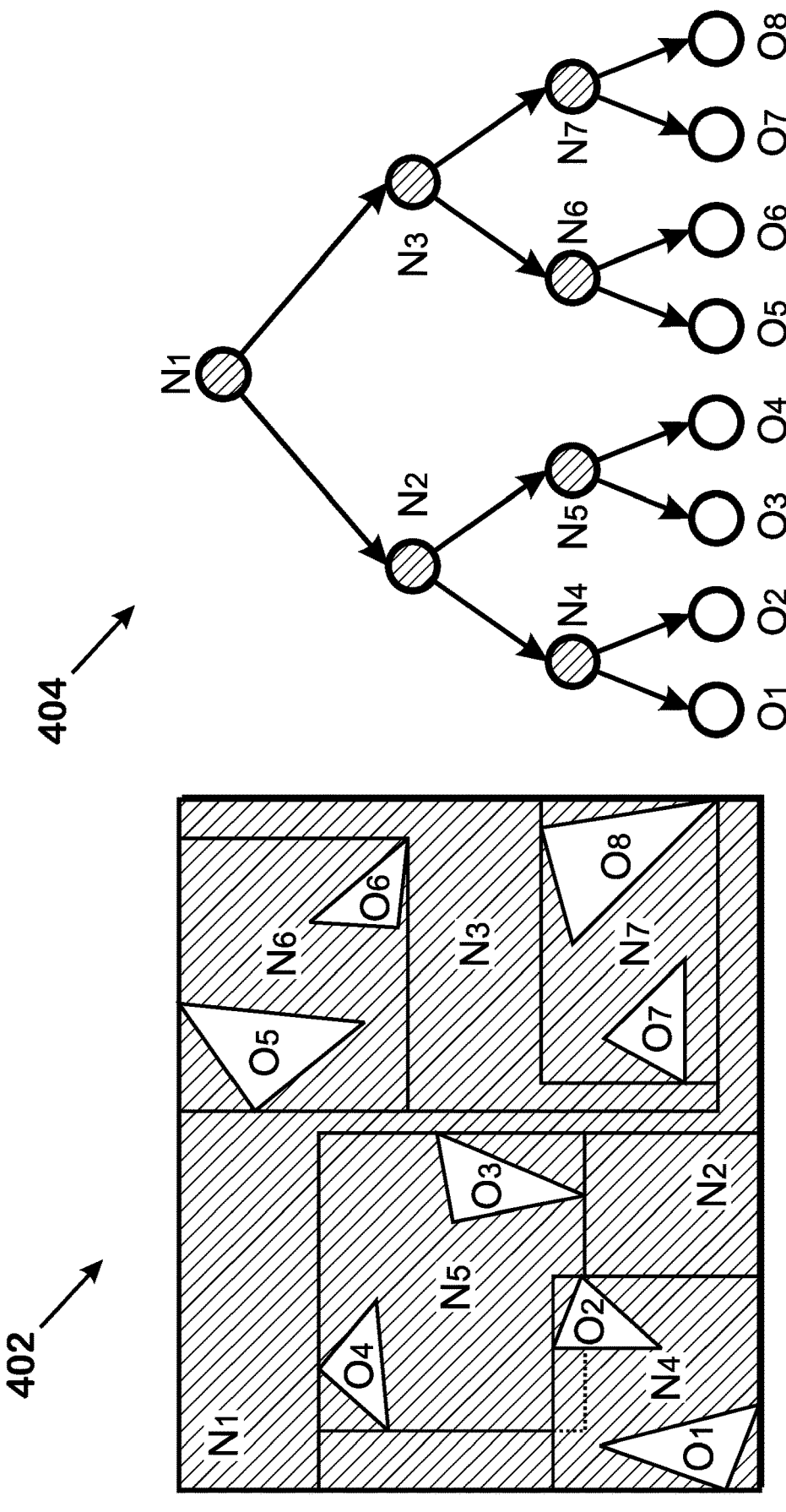
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node. For non-leaf nodes that are not eliminated, the ray intersection test would intersect the ray with such non-eliminated nodes, to determine whether children of such nodes should be eliminated from consideration. For leaf nodes or non-leaf nodes that are eliminated, the ray intersection test does not perform an intersection test of the ray with such nodes. In sum, to perform an intersection test for a ray, the ray racing pipeline 300 begins with one or more starting non-leaf nodes and tests one or more of those non-leaf nodes for intersection with the ray. The ray tracing pipeline 300 follows the edges of the bounding volume hierarchy, testing non-leaf nodes against the ray to either eliminate or not eliminate children of those nodes. For leaf nodes encountered by the ray tracing pipeline 300, the ray tracing pipeline 300 tests the ray against such nodes to determine whether the ray intersects the geometry associated with such leaf nodes.

In an example, the ray intersects $O_5$ but no other triangle. The test would test against $N_1$, determining that that test succeeds. The test would test against $N_2$, determining that the test fails (since $O_5$ is not within $N_2$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As described herein, non-leaf nodes are associated with bounding boxes that bound the geometry of the children of those non-leaf nodes. Leaf nodes are associated with geometry of the scene against which rays are tested. A variety of geometry types may exist. Some example geometry types for leaf nodes are triangles and procedural geometry, although this is not an exhaustive list. Procedural geometry is geometry whose intersection with a ray is defined procedurally, rather than as data. More specifically, procedural geometry is associated with leaf nodes, and represents the geometry that a ray is tested against to determine whether a ray hits the geometry of such leaf nodes. In the process of traversing a bounding volume hierarchy, in response to the ray tracing pipeline 300 encountering a leaf node that has associated procedural geometry, the ray tracing pipeline 300 triggers execution of a procedure, such as one specified in a shader program (or through other means), to determine whether the ray intersects that procedural geometry. Thus, the test for intersection with a procedure is defined procedurally.

Figure 5:
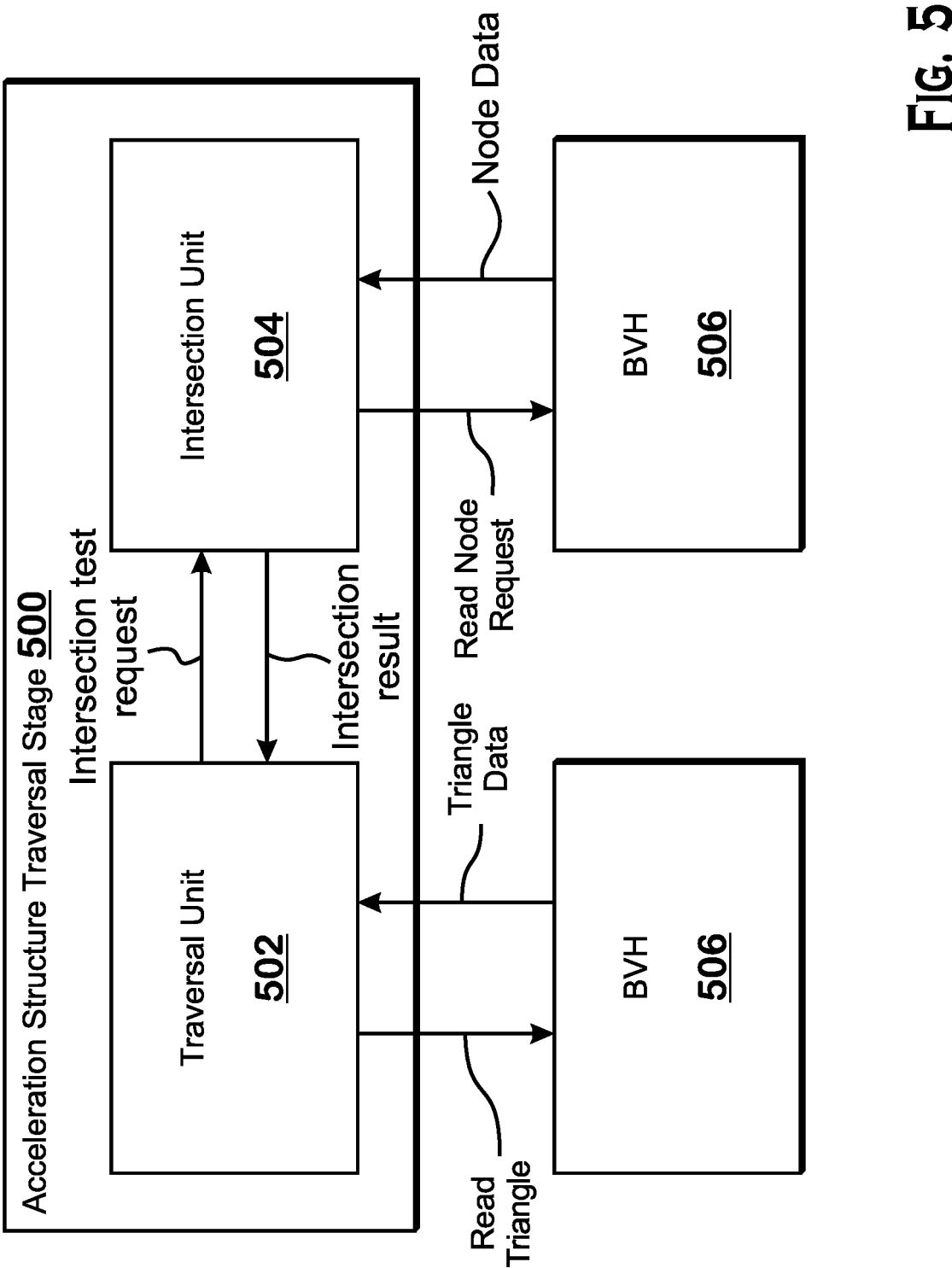
FIG. 5 is a block diagram of an acceleration structure traversal stage, according to an example.

FIG. 5 is a block diagram of an acceleration structure traversal stage 500, according to an example. In some implementations, the acceleration structure traversal stage 304 of FIG. 3 is the acceleration structure traversal stage 500 of FIG. 5.

The acceleration structure traversal stage 500 includes a traversal unit 502 and an intersection unit 504. The traversal unit 502 accepts a request to test a ray for intersection with geometry in a scene. The traversal unit 502 traverses the nodes of the acceleration structure 506, requesting and obtaining node data from the acceleration structure 506, and requests intersection tests be performed by the intersection unit 504. The intersection unit 504 performs the requested intersection tests for the traversal unit 502 and returns the results of the intersection tests to the traversal unit 502. Although a particular hardware configuration is shown (traversal unit 502 and intersection unit 504), the operations described as being performed by these units can be performed by any hardware, software, or combination of hardware and software.

In an example, the traversal unit 502 receives a ray to test for intersection with the geometry of the scene represented by the acceleration structure 506. The traversal unit 502 reads a first non-leaf node (in an example, N2 from bounding volume hierarchy 404 of FIG. 4) from the acceleration structure 506 and requests that the intersection unit 504 test the ray against the geometry of that node. The intersection unit 504 performs that test and returns the test result to the traversal unit. The result indicates that the ray does not intersect the box and therefore eliminates children of the non-leaf node from consideration. Subsequently, the traversal unit 502 reads another non-leaf node (in an example, N3) from the acceleration structure 506 and requests that the intersection unit 504 test the ray against the geometry of that node. The intersection unit 504 performs that test and returns the test result to the traversal unit 502. The test result indicates that the ray intersects the box associated with that node and therefore the traversal unit 502 continues with testing the children of that non-leaf node (in the example, nodes N6 and N7).

In various implementations, the traversal unit 502 and intersection unit 504 are implemented as software executing on a programmable processor, hard-wired circuitry, or a combination thereof. In one example implementation, the traversal unit 502 is a shader program (a "traversal shader program") executing on one or more compute units 132. The intersection unit 504 is dedicated hardware circuitry config-ured to perform intersection tests, such as ray-triangle and ray-box intersection tests. The traversal shader program executes instructions of an instruction set architecture which includes at least one instruction to request that the intersec-tion unit 504 perform an intersection test for the ray. In some implementations, for procedural geometry, the traversal shader program triggers execution of a set of instructions for testing the ray against procedural geometry. In other imple-mentations, the traversal unit 502 is a hard-wired circuitry unit that performs the operations described herein.

As described above, in some examples, the traversal unit 502 uses a traversal shader program to traverse the bounding volume hierarchy to determine intersection information for a ray. These traversal shader programs execute in a SIMD manner in the compute units 132. Each work-item executes for a single ray. As described above, the work-items execute in parallel, such that multiple work-items are traversing a bounding volume hierarchy for multiple rays in parallel.

Executing a traversal shader program involves perform-ing a series of iterations. In each iteration, the traversal shader program identifies at least one node of the BVH to test a ray against and requests the intersection unit 504 test the ray against that node. If the identified node is a box node and the ray is determined to intersect that node, then the traversal shader program identifies the children of that box as nodes for testing in subsequent iterations, and requests the ray be tested against those children in the subsequent iterations. For a leaf node, if a hit is detected, the intersection unit 504 triggers execution of an appropriate shader program as described with respect to FIG. 3.

The traversal shader program executes in "lockstep," in a SIMD manner, to the degree possible, with each work-item representing a different ray. More specifically, performing ray tracing involves testing multiple rays against a scene and coloring pixels according to the results of such tests. Mul-tiple rays are parallelized in a SIMD manner, and work for testing such rays against the scene is executed as a plurality of wavefronts. In an example, the traversal shader program identifies a node to test for each work-item (and thus each ray) of a wavefront in parallel, requests intersection tests be performed by the intersection unit 504 in parallel, and performs other operations in parallel.

Work-items executing a traversal shader as a wavefront can end execution at different times. This is because of the nature of ray tracing and BVH traversal. More specifically, intersection tests can be designated to terminate at various points. For example, some intersection tests are designated to end after any hit with a leaf node occurs, other intersection tests are designated to end after a closest hit with a leaf node occurs, and other variations are possible. These different modes, as well as the fact that different rays point in different directions and thus intersect with different geometry, means that different rays will require a different number of itera-tions through the traversal shader before completion. This fact means that work-items executing for the acceleration structure traversal stage 500 can terminate at different points in time, and thus that it is possible for the acceleration structure traversal stage 500 to grow more and more idle as different work-items terminate their traversal through the bounding volume hierarchy for a ray.

Figure 6:
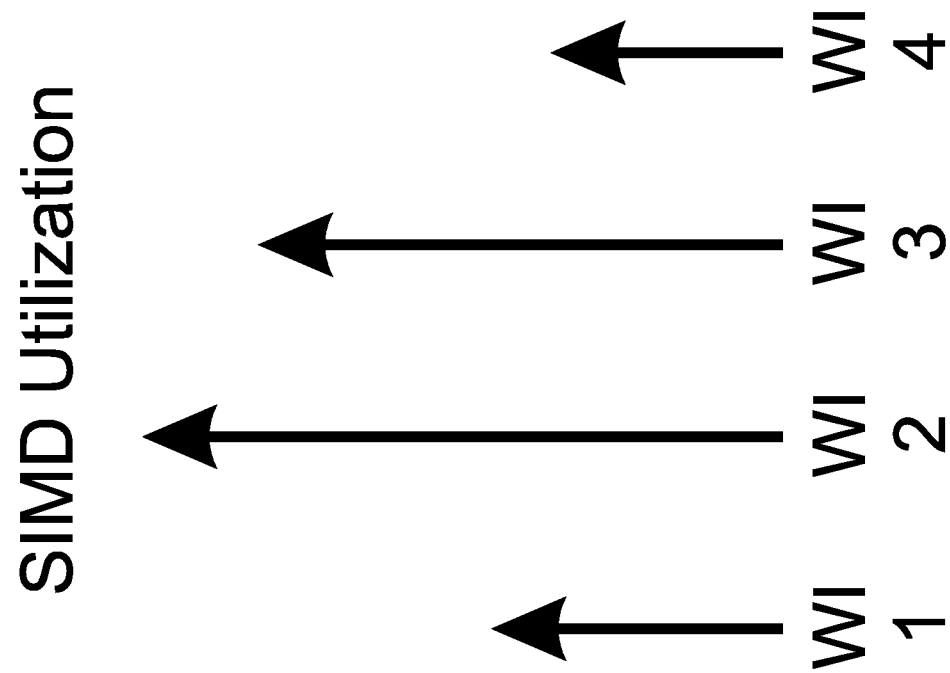
FIG. 6 illustrates decreasing intersection utilization as work-items of a traversal shader program terminate.

FIG. 6 illustrates the difference in utilization as a wave-front executing a traversal shader proceeds, according to an example. The SIMD utilization 602 illustrates the work-items (abbreviated "WI") proceeding to completion. Each work-item corresponds to an arrow and the point of termi-nation of an arrow corresponds to the end of execution of the work item. It can be seen that the SIMD utilization reduces as more work-items proceed to completion.

Figure 7:
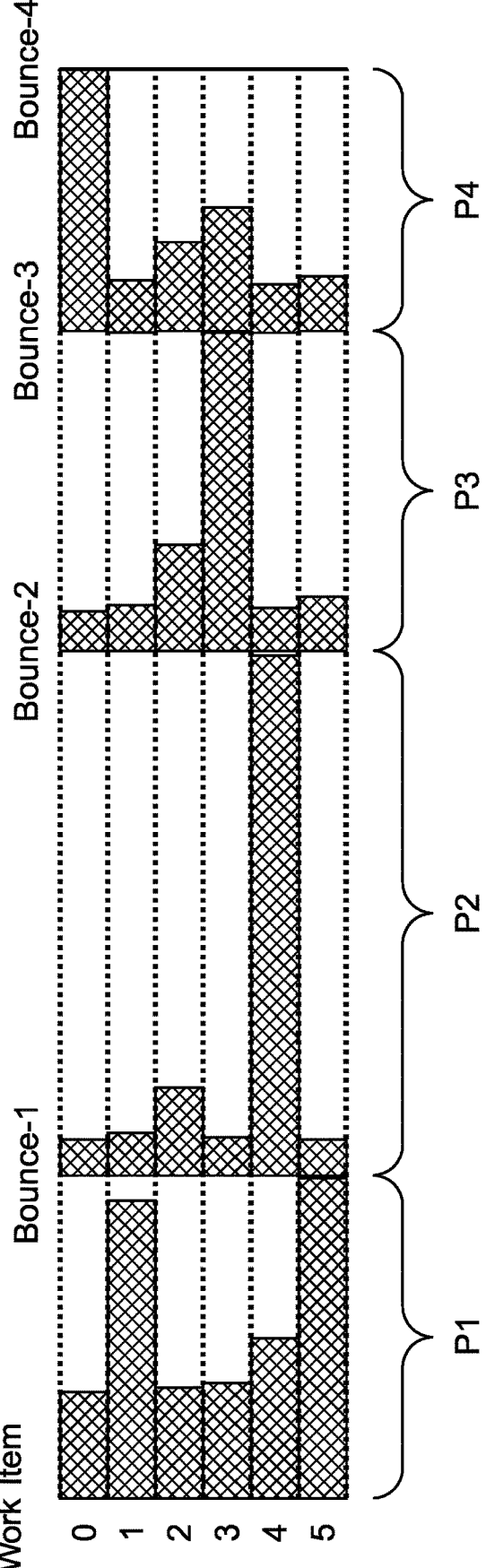
FIG. 7 illustrates decreasing intersection utilization as work-items of a traversal shader program terminate, according to a further example.

One cause of low performance in ray tracing is divergent control flow during bounding volume hierarchy traversal. For example, in one wavefront with multiple work-items, most work-items will become inactive and stop traversal after some traversal steps, at which point only one or a small subset of the work-items will continue traversal. FIG. 7 illustrates the difference in SIMD utilization where diver-gent control flow exists. There are six work-items shown, each corresponding to a row in the diagram. Time segments P1-P4 are also shown. For each time segment, processing of all work-items must complete before processing in the subsequent time segment can begin. For example, in time segment P1, work-items 0-4 must wait until work-item 5 is completed before processing of all work-items begins again in P2. The white spaces on each row thus correspond to idle time for the intersection unit 504. The "bounces" indicate points at which newly spawned rays begin their traversal through the bounding volume hierarchy. More specifically, as described above, shaders resulting from a hit or a miss (e.g., any hit shader, closest hit shader, miss shader) may themselves spawn rays, which can be thought of as "bounc-ing" from the point of intersection. In FIG. 7, control flow may diverge during traversal of a bounding volume hierar-chy in one instance (e.g., in time period P1), but control flow then converges at the "bounce" time, beginning traversal of the bounding volume hierarchy for the new, bounced ray. Like FIG. 6, FIG. 7 shows that the utilization of the acceleration structure traversal stage 500 reduces as more work-items proceed to completion. Herein, the term "utili-zation of the traversal stage 500" is sometimes used. This term means utilization of hardware resources used for per-forming the traversal stage. In some examples, a SIMD unit includes a certain number of copies of such hardware resources and as work-items terminate, more of those hard-ware resources become idle.

Significant divergence is caused by processing of triangle nodes, rather than box nodes. This disclosure presents a variable rate traversal technique to accelerate triangle node traversal. As described above, the acceleration structure traversal stage 500 traverses through the bounding volume hierarchy in a loop that has iterations. In each iteration, the acceleration structure traversal stage 500 obtains a node of the BVH from a list of nodes to test, tests that node, and places nodes that are the result of that test back into the list. In a specific example, up to eight triangle nodes per work-item are processed in one loop iteration of traversal of the bounding volume hierarchy. In each traversal loop iteration, multiple continuous triangle nodes and ray intersection per work-item are processed. The number of nodes to be pro-cessed per iteration is not fixed. In some embodiments, the number of nodes to be processed is dependent on cache line size for cache lines that store triangle data, as well as the type and degree of compression of the contents of that cache line. By preordering the triangle node data in memory, such that triangle nodes that will be fetched together in a loop iteration are found within the same cache line, a number of nodes corresponding to the size of the cache line can be read in a single transaction back from memory in each iteration. By contrast, if the triangle node data were not ordered in that manner, then multiple transactions—one per item of triangle node data—would be needed to read all data for each iteration. In some examples, it is possible for a transaction to fetch multiple cache lines, and thus ordering or grouping triangles together in cache lines that would be fetched together in a single loop iteration would provide the above benefit of reduction of memory transactions.

Figure 8:
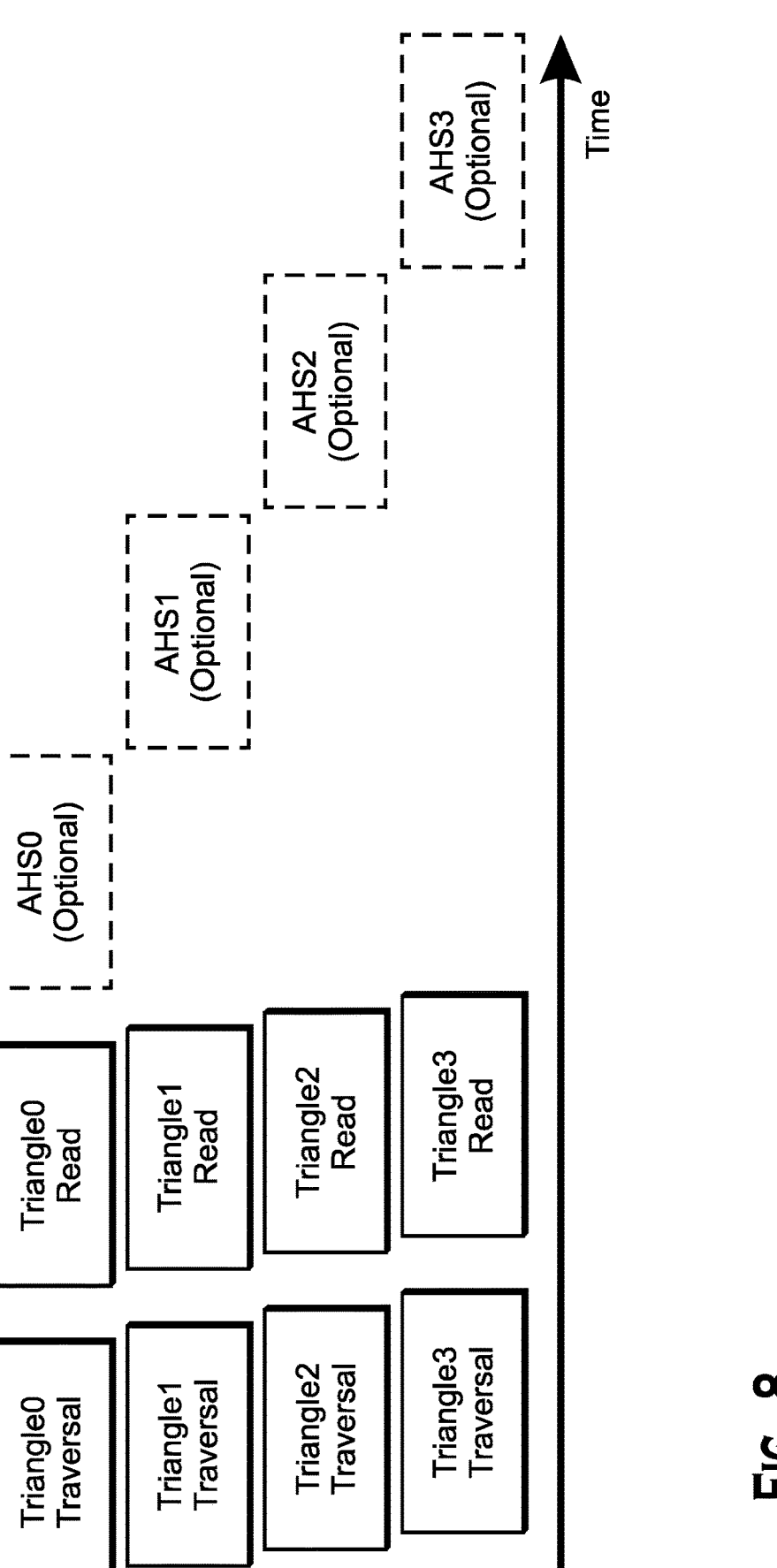
FIG. 8 illustrates a technique for accelerating triangle node traversal, according to an example.

FIG. 8 illustrates a technique for accelerating triangle node traversal, according to an example. In FIG. 8, the box labelled "Triangle0 Traversal" corresponds to a first traversal by intersection unit 504 to test for an intersection test with Triangle0.In the example, subsequent intersection tests by intersection unit 504 (represented by the boxes labelled "Triangle1 Traversal," Triangle2 Traversal" and "Triangle3 Traversal") occur quickly after the first request. Significantly, traversal unit 502 does not wait until the first request is completed by the intersection unit 504 before initiating the subsequent requests.

More specifically, when the traversal unit 502 encounters a box node that has multiple triangle nodes as children, the traversal unit 502 provides a request to the intersection unit 504 to test the ray against multiple triangle nodes, without waiting for completion of testing for any such triangle in the intersection unit 504. Each of the multiple requests is a request to test the ray against a triangle of the multiple triangles that are children of the box node. Further, these multiple requests occur within the same iteration of the BVH traversal loop described above.

As discussed below in connection with FIG. 9, upon completion of each intersection test, the intersection test unit 504 sends a response corresponding to the intersection test result to traversal unit 502. After the response to the last intersection test request is received, traversal unit 502 sends a read request (labelled "Triangle0 Read") to a memory system that stores the BVH for triangle data indicating how to color the ray, if the response to the request indicates that the intersection of the ray and triangle is a hit. Optionally, subsequent requests for triangle color data (represented by the boxes labelled "Triangle1 Read," Triangle2 Read" and "Triangle3 Read") occur quickly after the first read request. Again, traversal unit 502 does not wait until the first read request is completed before initiating the subsequent read requests if subsequent read requests exist. It should be understood that the latency of completion of the memory request can be much greater that the amount of time it takes the traversal unit 502 to generate and emit those requests.

It should be understood that the activity illustrated in FIG. 8 represents activity of a single work-item. In general, each individual work-item executing in the traversal unit 502 is assigned a single ray, and the work-item traverses the BVH for that ray to determine results and execute the needed shaders.

As shown in FIG. 8, requests to execute any hit shaders 306 optionally follow completion of the read requests. More specifically, the intersection tests result in a return to the traversal unit 502 that the ray either hits or misses the triangle. The traversal unit 502 determines whether to execute an any hit shader based on such return. In at least some situations, based on the return indicating a hit, the traversal unit 502 determines that an any hit shader should be executed. Because these any hit shaders cannot execute in a single work-item in parallel, the traversal unit 502 triggers execution of these any hit shaders serially. The work-item is capable of requesting intersections be performed in parallel on the intersection unit 504 because the intersection unit 504 has such parallel processing capability (in some examples, the intersection unit 504 is pipelined, meaning that at any given time, the intersection unit 504 is capable of processing multiple intersection requests at different stages of completion). Moreover, the work-item is capable of requesting that multiple reads occur in parallel because the memory system is capable of performing such multiple reads in parallel.

While the intersection unit 504 and memory system are capable of performing respective operations in parallel, each of these units has a limited throughput rate that indicates the maximum number of transactions that can be performed in any given amount of time. When the amount of control flow divergence is low and most of the work-items of a wavefront are traversing the BVH, the amount of benefit that can be gained by performing the technique described herein may not be high, since the memory system and intersection unit 504 will be close to their respective capacities. However, as the number of work-items who complete their traversal increases and the amount of divergence also increases, the amount of benefit gained using the above technique will increase, since the work-items that are still active and traversing the BVH decreases. As the number of work-items decreases, the "pressure" on the capacity of the intersection unit 504 and memory system from the wavefront decreases, and thus there is increased capacity available for each of the still-active work-items.

Figure 9:
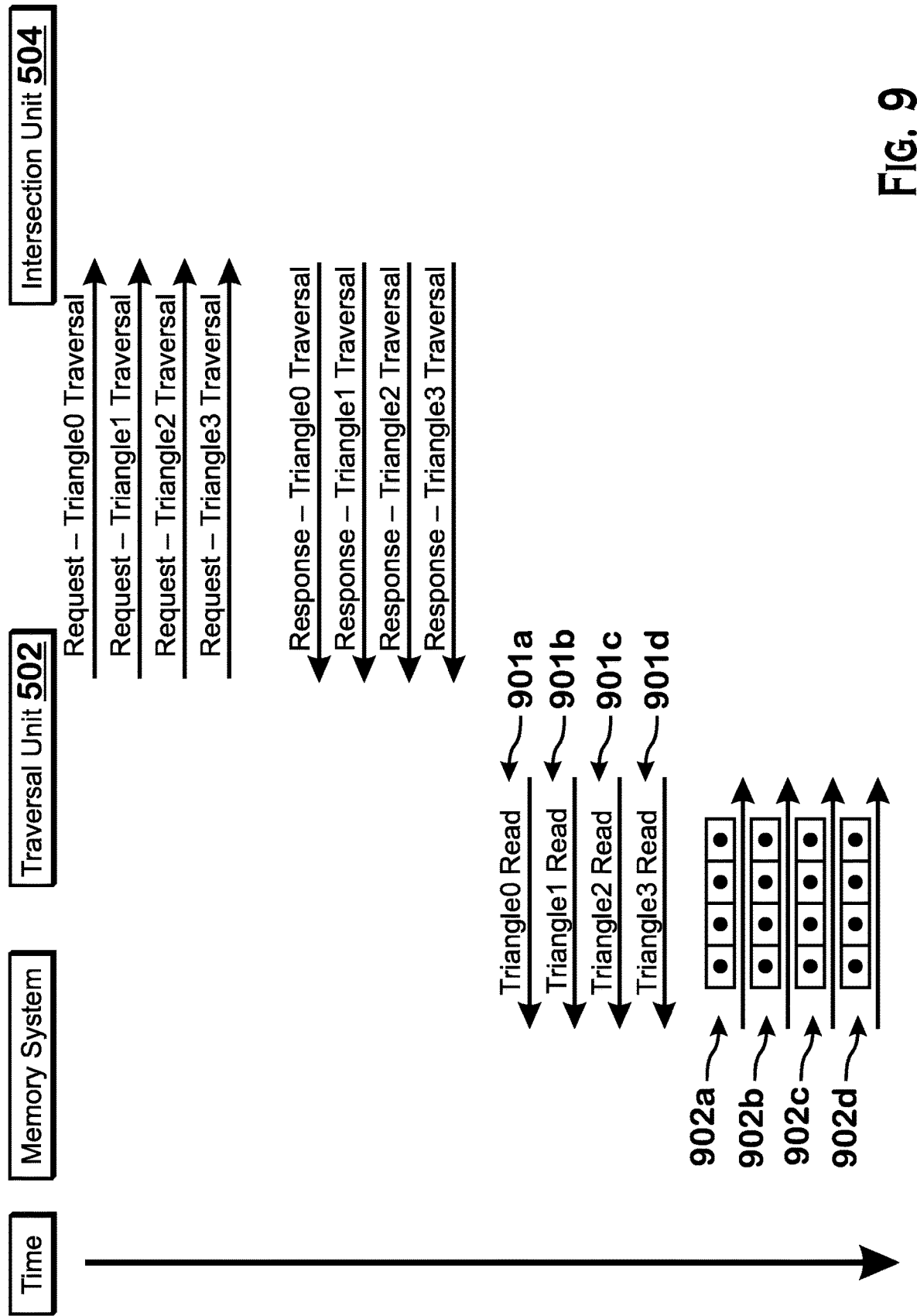
FIG. 9 provides an alternate representation of the technique for improving ray tracing pipeline utilization shown in FIG. 8.

FIG. 9 provides an alternate representation of the technique for improving ray tracing pipeline utilization shown in FIG. 8. As shown in FIG. 9, intersection test requests are made in sequence by traversal unit 504, without waiting for a response from intersection unit 504. After some latency, responses to the four or more intersection test requests are provided to traversal unit 502. After the responses are received, and depending on whether the triangle node is hit by a ray or not, traversal unit 502 optionally sends read requests 901a, 901b, 901c and 901d to a memory system to retrieve triangle data indicating how to color the rays. As explained more fully below in connection with FIG. 11, each response 902a, 902b, 902c and 902d corresponds to a cache line with ordered triangle data for four triangle nodes. In some examples, the multiple transactions between traversal unit 502 and intersection unit 504 are embodied as a single request from the traversal unit 502 to the intersection unit 504, and this request is to test multiple nodes for intersection.

The ordering of the triangle node data further optimizes processing speed by reducing the number of cache line accesses required for processing. For example, while four cache lines are shown being returned in FIG. 9, if the requested data for all triangles are within the same cache line, then only a single cache line needs to be returned, and all of the outstanding read requests 901 are satisfied when the first such request is satisfied. While each cache line includes data for four triangle nodes in this example, it will be understood that a cache line of any length may be used. Moreover, although shown as returning one cache line, it is possible that the read requests to the memory system result in a return of multiple cache lines (such as two cache lines). Although not shown in FIG. 9, the technique of FIG. 9 is alternatively implemented with unordered triangle data.

Figure 10:
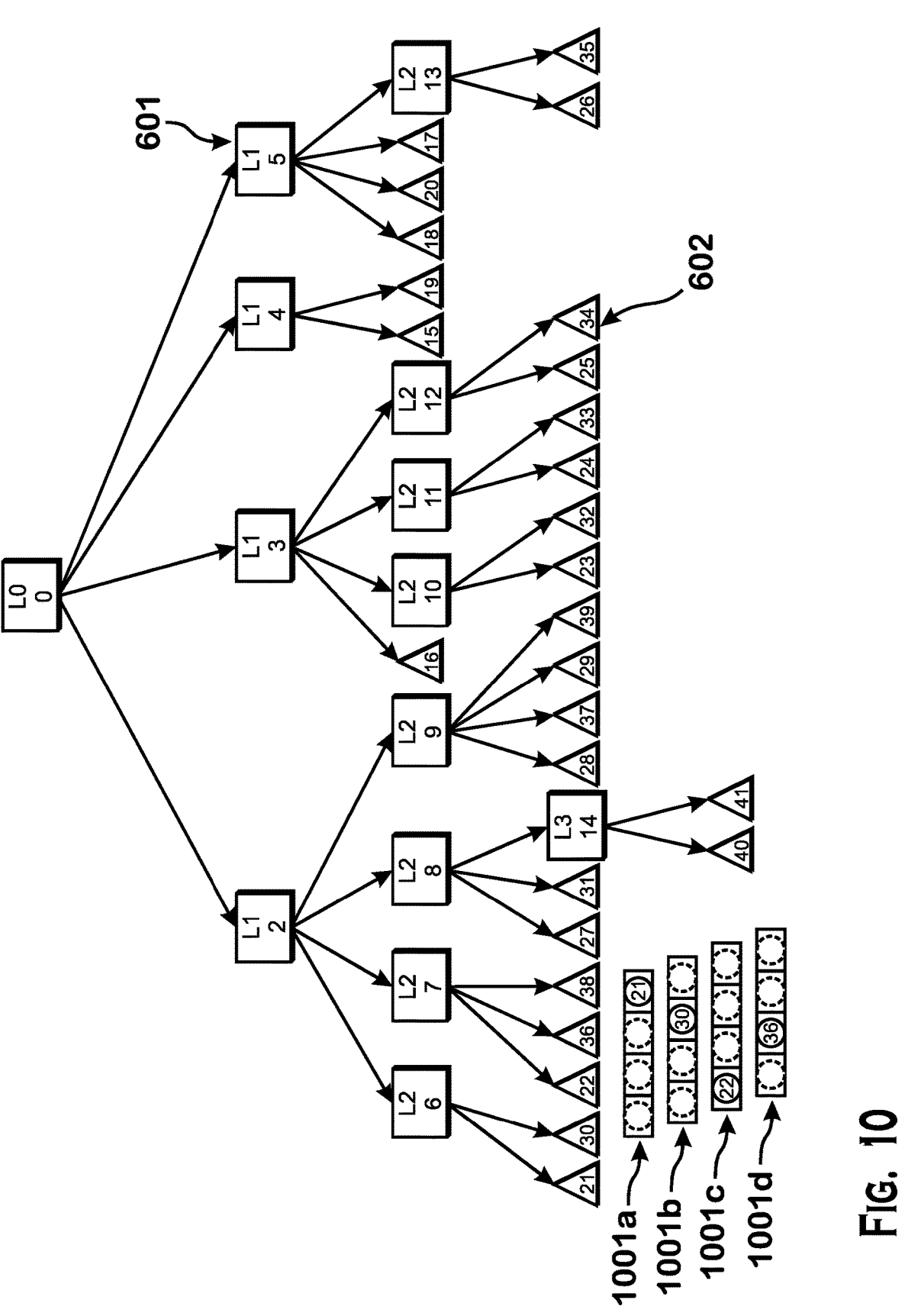
FIG. 10 is an illustration of a bounding volume hierarchy, according to an example where triangle node data is unordered.

FIG. 10 is an illustration of a bounding volume hierarchy, according to an example where triangle node data is unordered. As shown in FIG. 10, the triangle leaf nodes are not ordered consecutively. For example, node 21 is adjacent to node 30, which is adjacent to node 22, and so on. The fact that the leaf nodes 602 are not ordered consecutively means that the memory locations at which the leaf nodes are stored do not necessarily correspond to the topology of the BVH. In other words, the triangle nodes that are children of the same box node are not necessarily arranged consecutively in memory. Consequently, such triangle nodes are not necessarily stored in the same cache line.

In this example, read request 901*a* corresponds to a request for node data corresponding to triangle node 21. Cache line 1001*a* is returned in response to read request 901*a*. Cache line 1001*a* includes data for node 21, along with data for three other triangle nodes. Traversal unit 502 accesses the data for node 21 from cache line 1001*a*, but does not access the other node data in the cache line. Continuing with the example, read request 901*b* corresponds to a request for node data corresponding to triangle node 30. Cache line 1001*b* is returned in response to read request 901*b*. Cache line 1001*b* includes data for node 30, along with data for three other triangle nodes. Traversal unit 502 accesses the data for node 30 from cache line 1001*b*, but does not access the other node data in the cache line. The process continues for cache lines 1001*c* and 1001*d,* where in each case traversal unit 502 accesses node data for only one triangle node per cache line.

Figure 11:
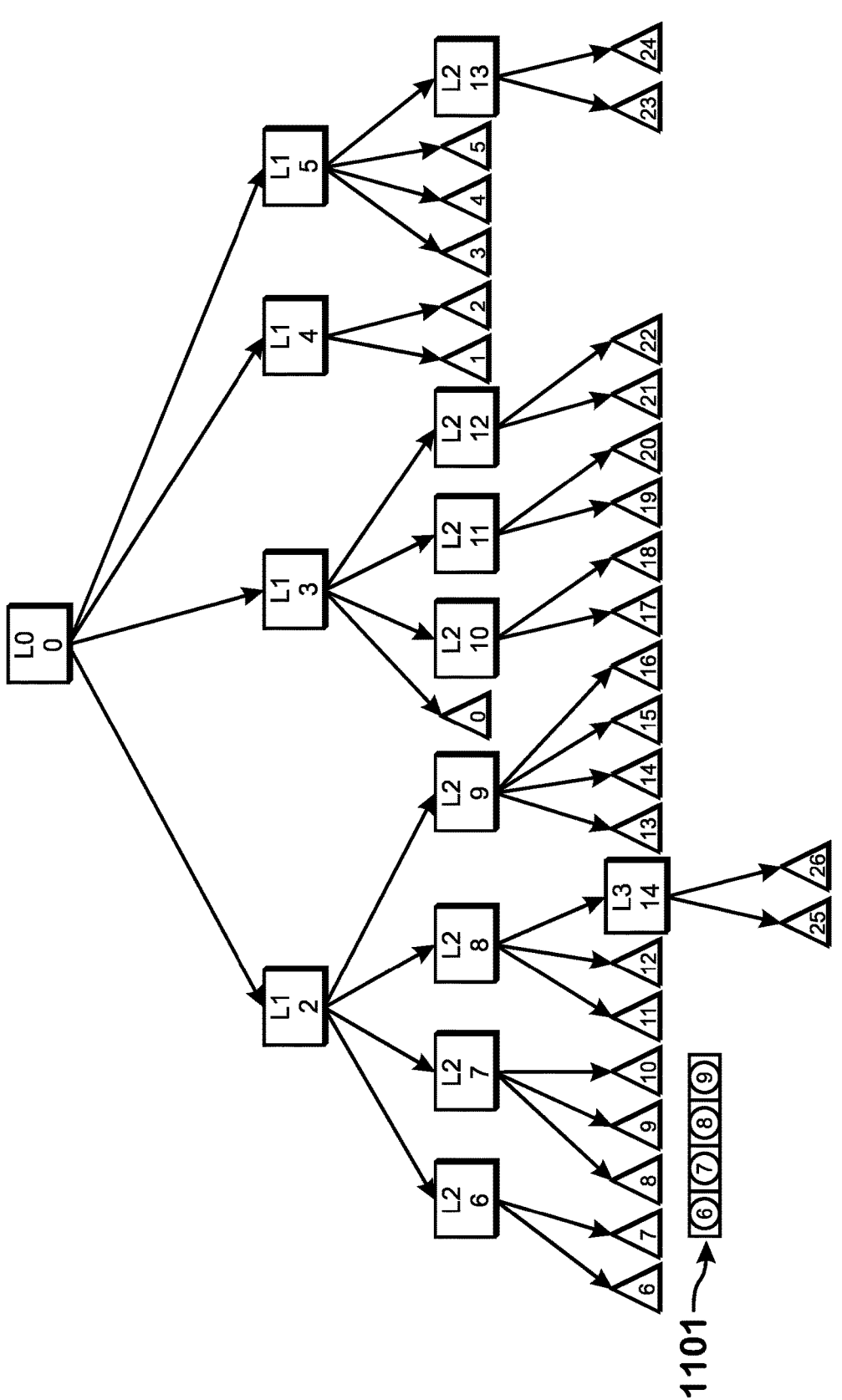
FIG. 11 is an illustration of a bounding volume hierarchy, according to an example where triangle node data is ordered.

FIG. 11 is an illustration of a bounding volume hierarchy, according to an example where triangle node data is ordered. As shown in FIG. 11, the triangle leaf nodes are ordered consecutively. For example, node 6 is adjacent to node 7, which is adjacent to node 8, and so on. In this example, read request 901*a* corresponds to a request for node data corresponding to triangle node 6. Cache line 1101 is returned in response to read request 901*a*. Cache line 1001*a* includes data for node 6, along with data for triangle nodes 7, 8 and 9. Traversal unit 502 accesses the data for nodes 6, 7, 8 and 9 with a single read of cache line 1101. In contrast to the technique shown in FIG. 10, the number of required cache line reads is significantly reduced when the triangle node data is ordered as shown.

In various examples, the sorting that occurs in FIG. 10 occurs as part of or after a BVH build operation. In other words, when a BVH builder (not shown) is building a BVH to be rendered (which can occur at various points in time, such as before initiating rendering for a new frame of data), the BVH builder organizes the triangles in such a way that triangles that are children of the same box node are stored within the same cache line. Alternatively, the BVH builder can organize the triangles such that all such triangles are stored within multiple lines that would be fetched in response to the same read request.

In addition, although the technique has been described herein as being used for triangle nodes, it is possible to use the technique for box nodes as well. More specifically, in some implementations, in response to traversing to a box node, the traversal unit 502 issues intersection test requests for each of the children of that box node, regardless of whether such a child is a box node or a triangle node. For triangle nodes, after the intersection test results are returned, the traversal unit 502 performs the read requests as described elsewhere herein, and performs additional operations as required, such as launching shader programs. For box nodes, the traversal unit 502 records the children of such box nodes that are intersected for the next loop iteration of traversal.

In some implementations, box nodes store the bounding boxes for all of their children. In such implementations, performing an intersection test for a box node means determining whether the ray intersects the bounding boxes for each child of that box node (and subsequently placing each such intersected node into a list for the subsequent BVH traversal iteration). In other words, in these implementations, performing a single intersection test for a box node means determining whether the ray intersects each child of that box node. In an example, node L1 2 in FIG. 10 includes bounding box information for each of nodes L2 6, 7, 8, and 9. In such example, performing an intersection test for L1 2 means determining whether the ray intersects each of box nodes 6, 7, 8, and 9. Performing an intersection test for each child of node 2, in accordance with the technique of the present disclosure (e.g., FIGS. 8 and 9), means determining whether the ray intersects each child of box node 6, and whether the ray intersects each child of box node 7, and each child of box node 8, and each child of box node 9.

Figure 12:
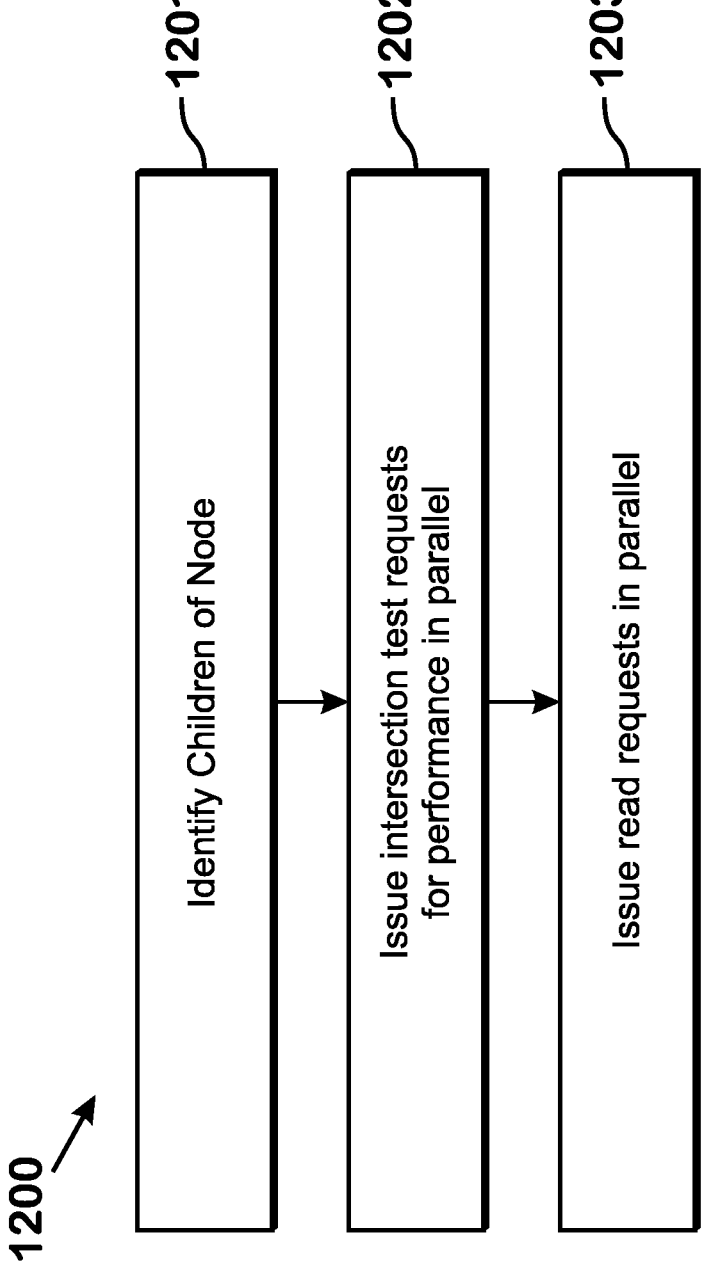
FIG. 12 is a flow diagram illustrating steps for accelerating triangle node traversal, according to an example.

FIG. 12 is a flow diagram of a technique 1200 for accelerating triangle node traversal, according to an example. Although described with respect to the system of FIGS. 1-11, those of skill in the art will understand that any system, configured to perform the steps of the technique 1200 in any technically feasible order, falls within the scope of the present disclosure.

In step 1201, the traversal unit 502 identifies children of a node. More specifically, as the traversal unit 502 traverses the BVH the traversal unit 502 encounters nodes of the BVH. In step 1201, when the traversal unit 502 traverses to a particular node, the traversal unit 502 identifies all of the nodes that are children of the particular node.

In step 1202, the traversal unit 502 issues intersection test requests for performance in parallel to intersection unit 504. More specifically, the traversal unit 502 issues the intersection tests to the intersection unit 504 to test a ray for intersection with each of the child nodes in parallel. The intersection unit 504 receives the intersection test requests and performs those intersection test to return a result that indicates whether the ray intersects the indicated child node. If the child node is a triangle node, then the intersection test is a test to determine whether the ray intersects the triangle. If the child node is a box node, then the intersection test is a test to determine whether the ray intersects one or more of the bounding boxes that bound the children of that box node.

In step 1203, traversal unit 502 issues parallel read requests to a memory unit. More specifically, for each of the child nodes indicated as being intersected by the ray, the traversal unit 502 issues a read request to read data for that node from a memory system that stores such data. Where the child node is a triangle node, the the read request is a request to obtain data for executing a shader such as an any hit shader or a closest hit shader. In various examples, such data is data that is used for determining the color of a pixel associated with the ray, such as data identifying a texture and/or texture coordinates, data identifying a shader to be executed, or other similar data.

Subsequent to step 1203, optionally, the traversal unit 502 causes one or more shaders to execute for one or more triangles determined to be intersected by the ray. In some examples, the shader executed is an any hit shader specified by the data fetched at step 1203. In some examples, because the any hit shader for each triangle can be different, execution of such shaders is serialized.

While FIG. 12 shows a single BVH traversal iteration, it will be understood that the technique is applicable to multiple iterations as well as a full BVH traversal. For example, the operations of FIG. 12 can be repeated as the traversal unit 502 traverses the BVH. In such example, the traversal unit 502 encounters nodes of the BVH and performs the steps of the technique 1200 to test rays for intersection with the nodes. For box nodes, the traversal unit 502 places indications of intersected box nodes into a data structure such as a queue or buffer, and then fetches such nodes from the queue or buffer to perform the operations described again. By repeating this process, the traversal unit 502 traverses a BVH for a ray cast operation.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132 of the collection of compute units 202), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. In addition, any of the stages of the ray tracing pipeline 300 are, in various implementations, implemented as hardware circuitry, software executing on a processor, or a combination thereof. In addition, any of the units of FIG. 1 or 2 are, in various implementations, implemented as hardware circuitry, software executing on a processor, or a combination thereof. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor. The illustrated elements of the APD 116 in FIG. 2 (e.g., the scheduler 136, graphics processing pipeline 134, compute units 132, and SIMD units 136) represent hardware elements such as hardware circuitry. The accelerations structure traversal stage 500 illustrates hardware (e.g., circuitry), software (e.g., shader programs) or a combination thereof. The acceleration structure 506 represents data in memory. All elements described as "hardware" are, in various examples, circuitry, including one or more of fixed function circuitry, digital circuitry, analogue circuitry, one or more processors (including programmable processors, field programmable gate arrays, or other processors), or any other technically feasible type of circuitry.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

identifying a plurality of child nodes that are children of a particular node in a bounding volume hierarchy (BVH);

submitting, in parallel and prior to receiving any results of the intersection tests, a plurality of requests for intersection tests of a ray, wherein each of the plurality of requests corresponds to a test for an intersection of the ray with a respective child node among the plurality of the child nodes; and in response to receiving results of the intersection tests, determining which of the child nodes are indicated as intersected by the ray.

2. The method of claim 1, further comprising:

in response to the results of the intersection tests, submitting a read request for triangle node data to a memory system, wherein the triangle node data comprises data for coloring the ray.

3. The method of claim 2, wherein the triangle node data comprises a cache line with data for a plurality of triangle nodes.

4. The method of claim 3, wherein the intersection tests require access to the bounding volume hierarchy.

5. The method of claim 4, wherein the bounding volume hierarchy comprises unordered triangle node leaves.

6. The method of claim 4, wherein the bounding volume hierarchy comprises ordered triangle node leaves.

7. The method of claim 6, wherein the cache line comprises data for a plurality of consecutive triangle leaf nodes.

8. The method of claim 7, wherein the intersection tests are performed using a pipelined architecture.

9. The method of claim 1, wherein the ray is associated with a wavefront of work-items executing in a single-instruction-multiple-data (SIMD) processing unit, and submitting, in parallel, the plurality of requests for intersection tests comprises generating, from the wavefront, a plurality of transactions each corresponding to a respective active lane of the wavefront.

10. A system for performing ray tracing operations, the system comprising:

a memory configured to store instructions; and one or more processors communicatively coupled to the memory, wherein the one or more processors are collectively configured to:

identify a plurality of child nodes that are children of a particular node in a bounding volume hierarchy (BVH);

submit, in parallel and prior to receiving any results of the intersection tests, a plurality of requests for intersection tests of a ray, wherein each of the plurality of requests corresponds to a test for an intersection of the ray with a respective child node among the plurality of the child nodes; and in response to receiving results of the intersection tests, determine which of the child nodes are indicated as intersected by the ray.

11. The system of claim 10, wherein the one or more processors are further collectively configured to:

in response to the results of the intersection tests, submit at least one read request for triangle node data to a memory system, wherein the triangle node data comprises data for coloring a ray.

12. The system of claim 11, wherein the triangle node data comprises a cache line with data for a plurality of triangle nodes.

13. The system of claim 12, wherein the intersection tests require access to the bounding volume hierarchy.

14. The system of claim 13, wherein the bounding volume hierarchy comprises unordered triangle node leaves.

15. The system of claim 13, wherein the bounding volume hierarchy comprises ordered triangle node leaves.

16. The system of claim 15, wherein the cache line comprises data for a plurality of consecutive triangle leaf nodes.

17. The system of claim 16, wherein the intersection tests are performed using a pipelined architecture.

18. The system of claim 10, wherein the one or more processors comprise at least one SIMD processing unit configured to execute wavefronts of work-items, and the one or more processors are configured to generate the plurality of requests for intersection tests based on active lanes of a wavefront associated with the ray.

19. A non-transitory computer-readable medium storing instructions that when executed by a processor cause the processor to perform operations including:

identifying a plurality of child nodes that are children of a particular node in a bounding volume hierarchy (BVH);

submitting, in parallel and prior to receiving any results of the intersection tests, a plurality of requests for intersection tests of a ray, wherein each of the plurality of requests corresponds to a test for an intersection of the ray with a respective child node among the plurality of the child nodes; and in response to receiving results of the intersection tests, determining which of the child nodes are indicated as intersected by the ray.

20. The non-transitory computer-readable medium of claim 19, wherein the operations further include:

in response to the results of the intersection tests, submitting at least one read request for triangle node data to a memory system, wherein the triangle node data comprises data for coloring the ray.

* * * * *